United States Patent [19]

Matlock et al.

[11] 4,109,638
[45] Aug. 29, 1978

[54] SOLAR ENERGY CONVERTER CAROUSEL

[76] Inventors: William C. Matlock; Patricia Matlock, both of 2123 S. Priest #216, Tempe, Ariz. 85282

[21] Appl. No.: 784,581

[22] Filed: Apr. 4, 1977

[51] Int. Cl.² .............................................. F24J 3/02
[52] U.S. Cl. ................................... 126/271; 126/270; 350/289
[58] Field of Search ............... 126/270, 271; 237/1 A; 60/641; 350/89

[56] References Cited

U.S. PATENT DOCUMENTS

| 1,162,505 | 11/1915 | Nichols | 126/271 |
|---|---|---|---|
| 2,872,915 | 2/1959 | Bowen | 126/271 |
| 3,847,136 | 11/1974 | Salvail | 126/271 |
| 3,884,217 | 5/1975 | Wartes | 126/271 |
| 3,998,206 | 12/1976 | Jahn | 126/271 |

Primary Examiner—Kenneth W. Sprague
Attorney, Agent, or Firm—Warren F. B. Lindsley

[57] ABSTRACT

A solar energy collector and converter carousel comprising a plurality of elongated reflectors mounted on a platform for arcuate movement and mounted for further movement each around a heating tube arranged in the liner focus of the reflectors, the carousel being linked to a tracking mechanism which causes the reflectors to be trained toward the location of the sun so that they receive a maximum amount of solar energy.

3 Claims, 13 Drawing Figures

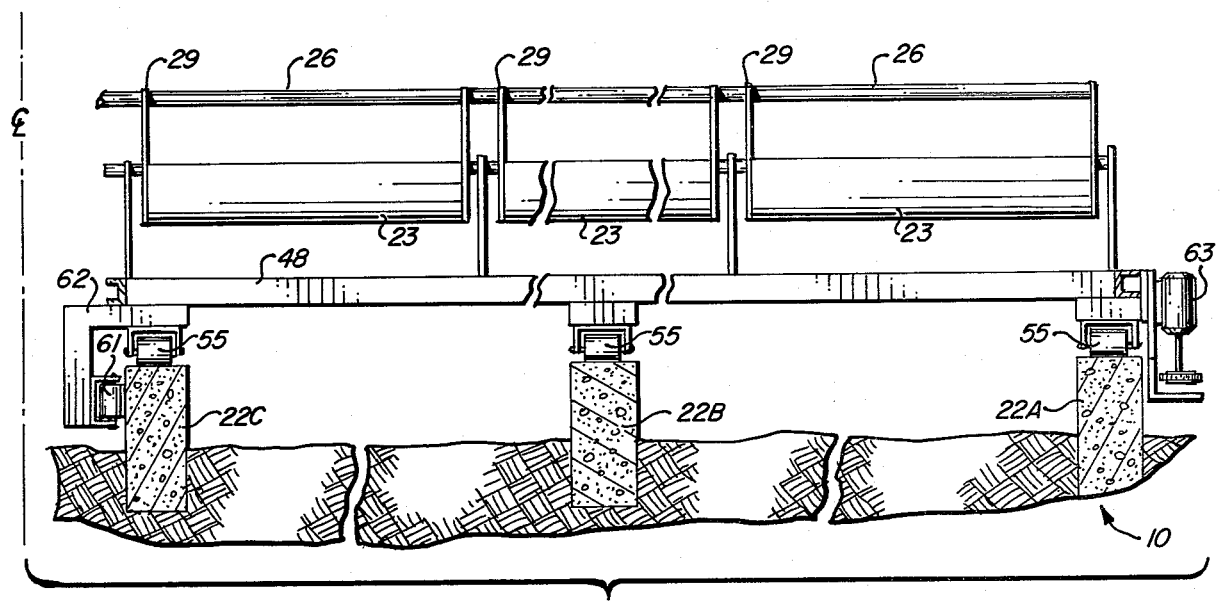
Fig. 9
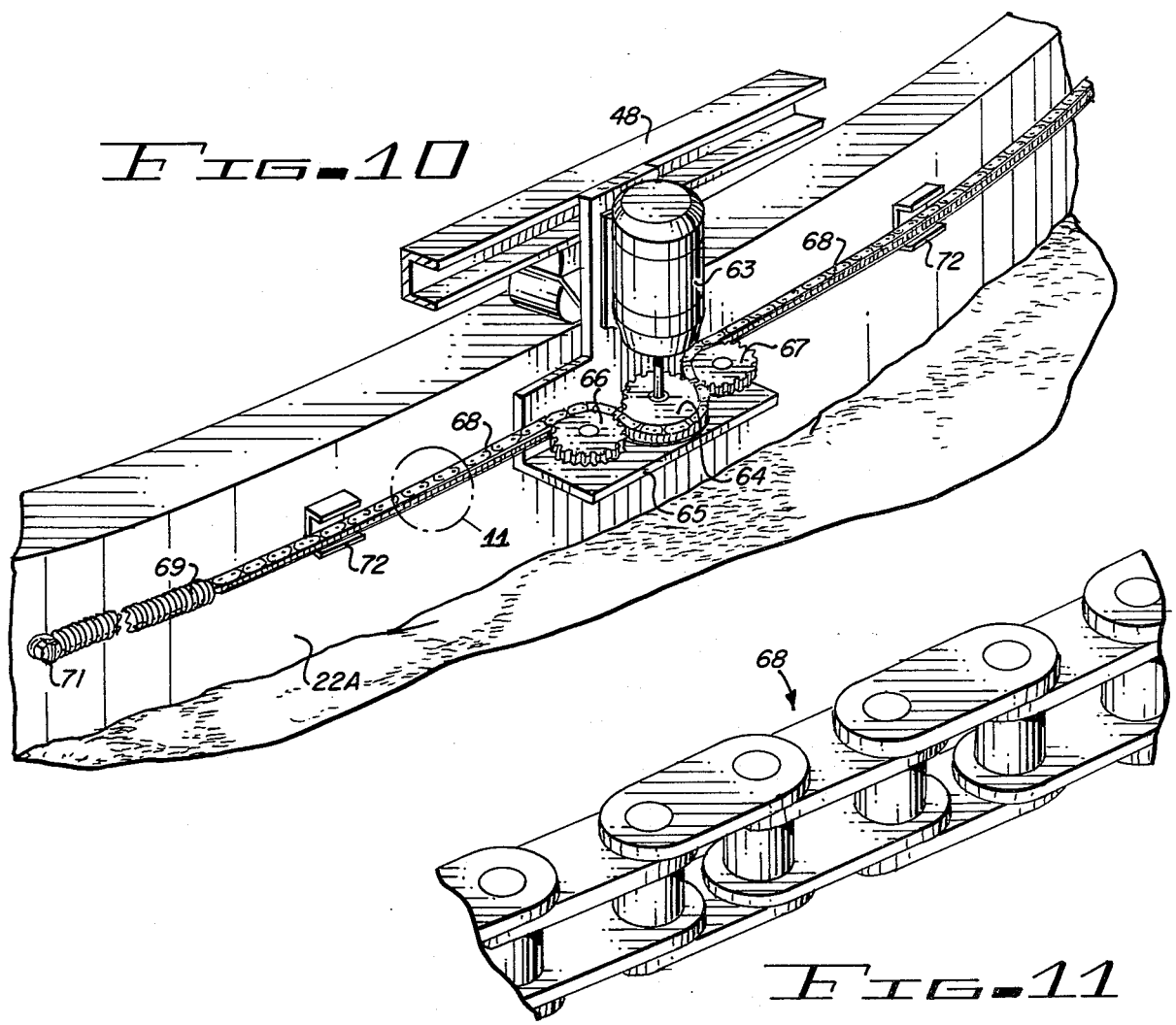
Fig. 10
Fig. 11

SOLAR ENERGY CONVERTER CAROUSEL

BACKGROUND OF THE INVENTION

In recent years, the rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the Middle East countries for supply. Such a dependence can and does have undesirable effects on the economies of the countries involved and political complications often result. There are also limited sites available that are appropriate for hydroelectric installations.

In the United States, there are a number of fossil fuels available such as high-sulphur coal and oil shale, but the development and use of these resources has been complicated by economic and environmental concerns which rule against the use of these resources for a number of reasons including the destructive effects of strip mining, atmospheric contamination due to the high sulphur content of the coal, the cost of extracting the oil from the shale, etc.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is solar energy.

The interest in this almost boundless resource and in its development and harnessing for use in homes and factories is rising as other resources dwindle. Its desirability is further enhanced by the fact that solar energy may be converted to practical use without the hazard of environmental contamination.

PRIOR ART

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device known as a flat plate collector is made of metal and glass with one or more layers of glass laid over a blackened metal plate. Air spaces are provided between the layers of glass and air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day its surface is not perpendicular to the rays of the sun.

A second disadvantage is that the flat plate collector does not permit the concentration of solar energy at a localized point as needed for the most effective heating of the water and the conversion of water to steam such as required in certain solar-to-electrical conversion processes.

Parabolic reflectors have been utilized in the past along with sun-tracking mechanisms in connection with various schemes for the collection, conversion and utilization of solar energy. Variations of such equipment are described in U.S. Pat. Nos. 495,163; 787,145; 820,127; 3,713,727 and 4,000,734.

Heretofore, heat exchangers, particularly of the type adapted to collect cold or heat, have been constructed either with a series of tubes embedded in a flat reflective surface or have comprised a curved or semi-cylindrical reflector with a round tube mounted at approximately its focal point with U.S. Pat. Nos. 1,946,184 and 3,321,012 being representative thereof. Relative to this latter form of the prior art, fins or vanes have been mounted about the tube in an effort to obtain more efficiency from the unit.

At best, the prior art heat exchangers have been extremely inefficient even to the point where it is necessary to incorporate thereinto an elaborate system of gears and racks or other means to shift or otherwise change the positions of the exchange or collector unit so that its relative position to the source of heat will remain constant.

While such prior art inventions do suggest workable approaches for the realization of the important objectives involved, the particular implementations described in these patents have in general fallen short of what is required in a low-cost and practical system.

SUMMARY OF THE INVENTION

In accordance with the invention claimed, an improved solar energy collector and converter is provided which is compact and inexpensive by virtue of its uniquely designed reflectors and its sun-tracking mechanism.

It is, therefore, one object of this invention to provide an improved solar energy collector carousel.

Another object of this invention is to provide a compact and inexpensive solar energy collecting means employing a supporting platform for periodically moving a bank of solar collectors mounted thereon in an arcuate path.

A further object of this invention is to provide such an inexpensive solar energy collector which achieves maximum energy collection throughout the day by virtue of its effective yet inexpensive solar tracking mechanism and converter moving mechanism.

A further object of this invention is to provide an improved tracking mechanism for a solar energy collector which vertically and rotationally adjusts the direction of the reflectors as appropriate to track the position of the sun throughout the daylight hours.

A still further object of this invention is to provide a plurality of solar energy parabolic like reflective type collectors mounted in a rack on a platform and arranged to move in unison on the platform with a common stationary fluid heat transfer tube passing through the focal point of each of the collectors, said platform being movable daily through an arcuate path.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 9 is a cross-sectional view of FIG. 4 taken along line 9—9;

FIG. 10 is a side view of the support structure taken in the direction of arrow 10 in FIG. 9;

FIG. 11 is an enlarged view of section 11 of FIG. 10;

DESCRIPTION OF THE PREFERRED EMBODIMENT

Figure 1:
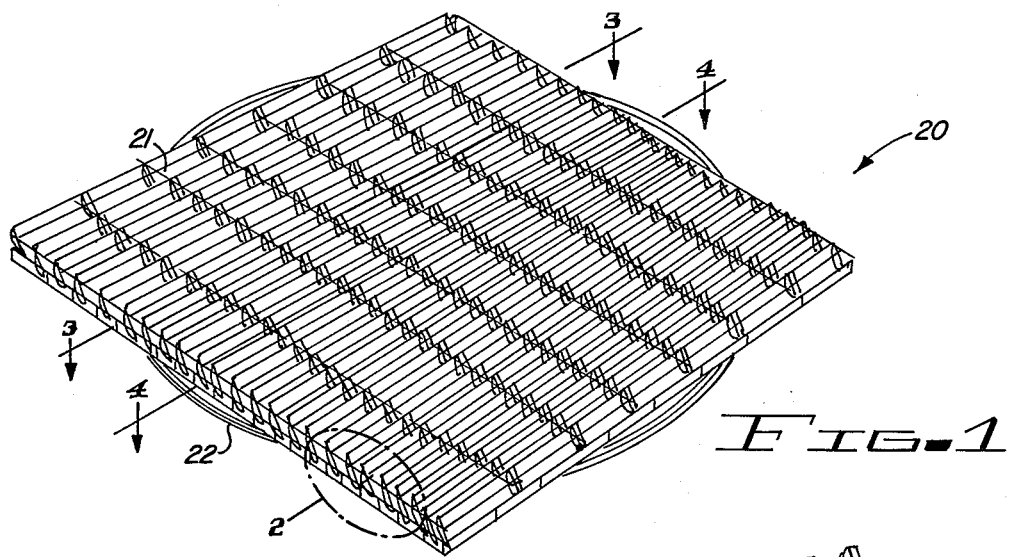
FIG. 1 is a perspective view of a solar energy collector carousel employing means for tracking the position of the sun.

Referring more particularly to the drawing by characters of reference, FIGS. 1–13 disclose a solar energy collection and conversion system 20 utilizing an array 21 of pivoting reflectors rotatably supported on concentric concrete rings 22, the total structure forming a carousel type structure.

Figure 2:
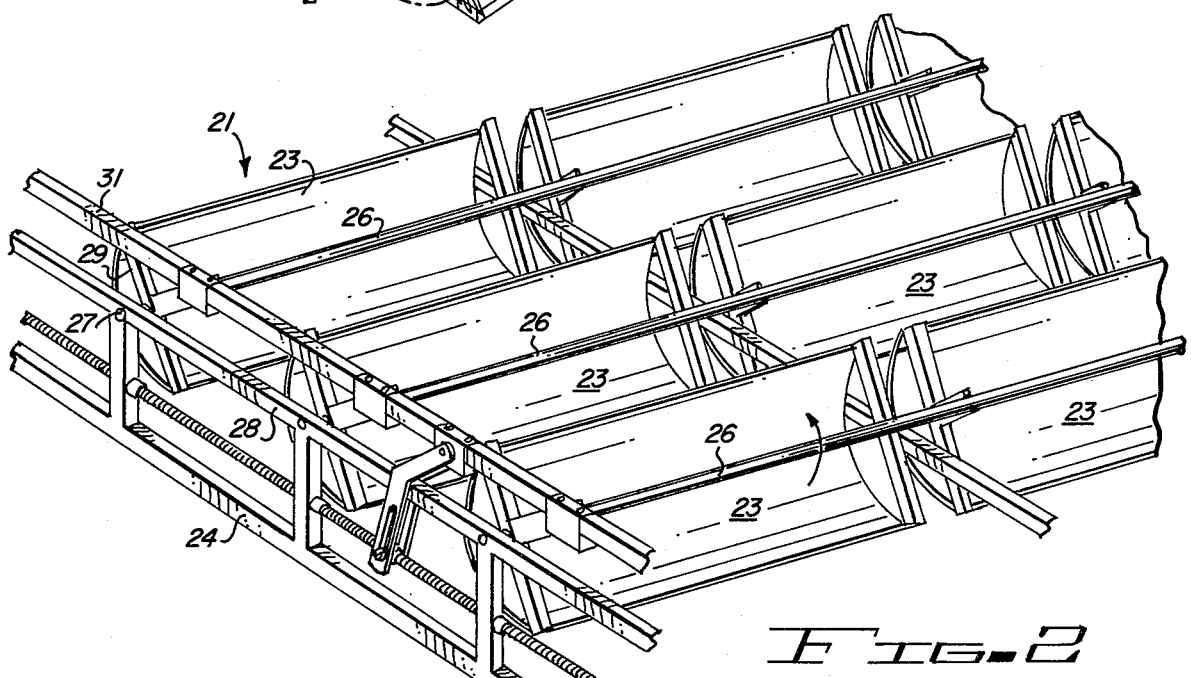
FIG. 2 is a close-up view of the portion of the collector of FIG. 1 identified as area 2.

The array 21, a portion of which is shown in FIG. 2, comprises a multiplicity of trough shaped reflectors 23 each pivotally mounted at both ends to a frame 24. An arm 25 extending perpendicularly from each end of each reflector 23 provides a support for a solar energy collector pipe 26 which runs parallel with the length of each reflector 23 coincident with its focal point so that the reflected rays of the sun are concentrated on pipe 26.

Figure 12:
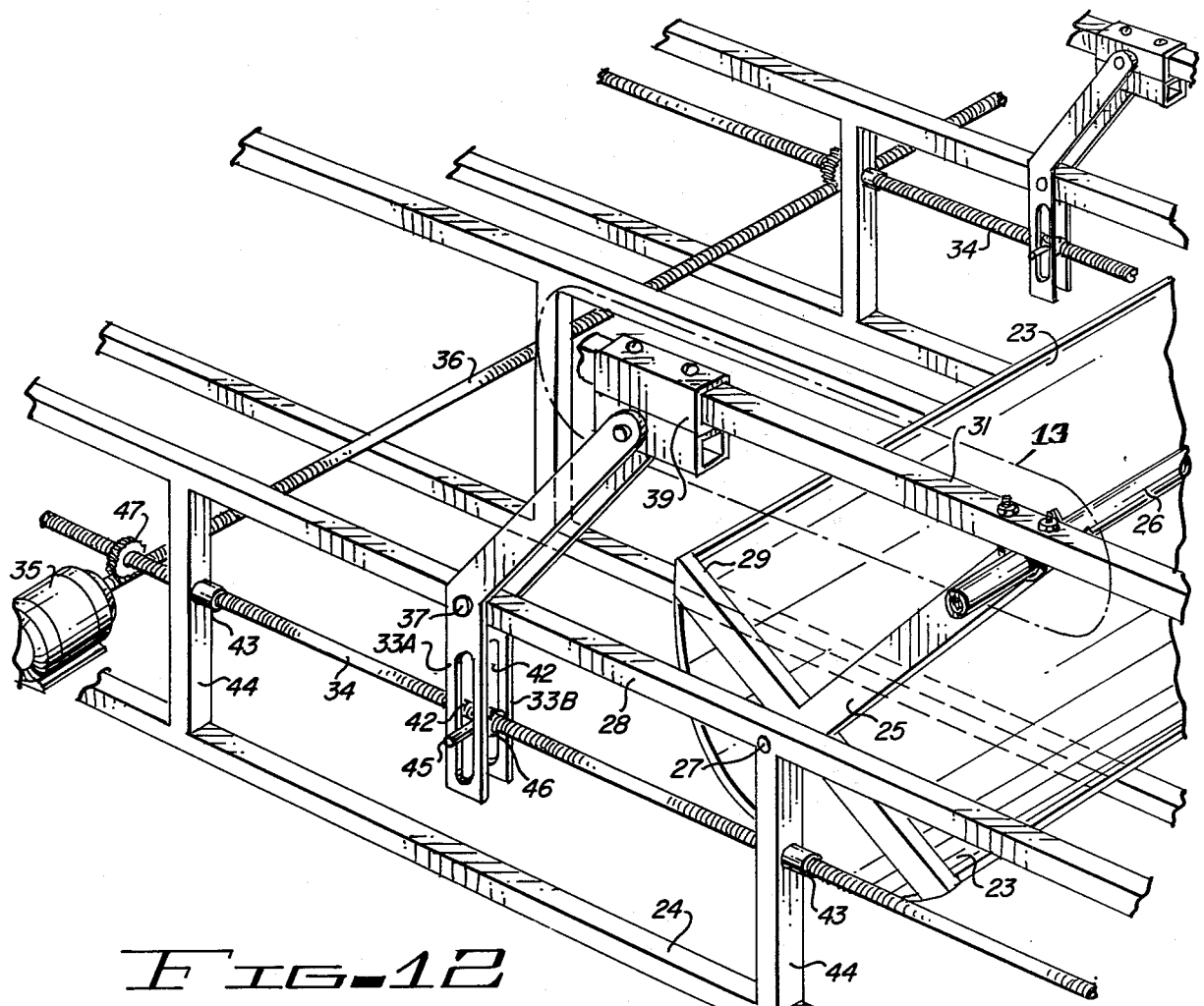
FIG. 12 is a perspective view showing apparatus involved in controlling the elevation of the solar reflectors.
Figure 13:
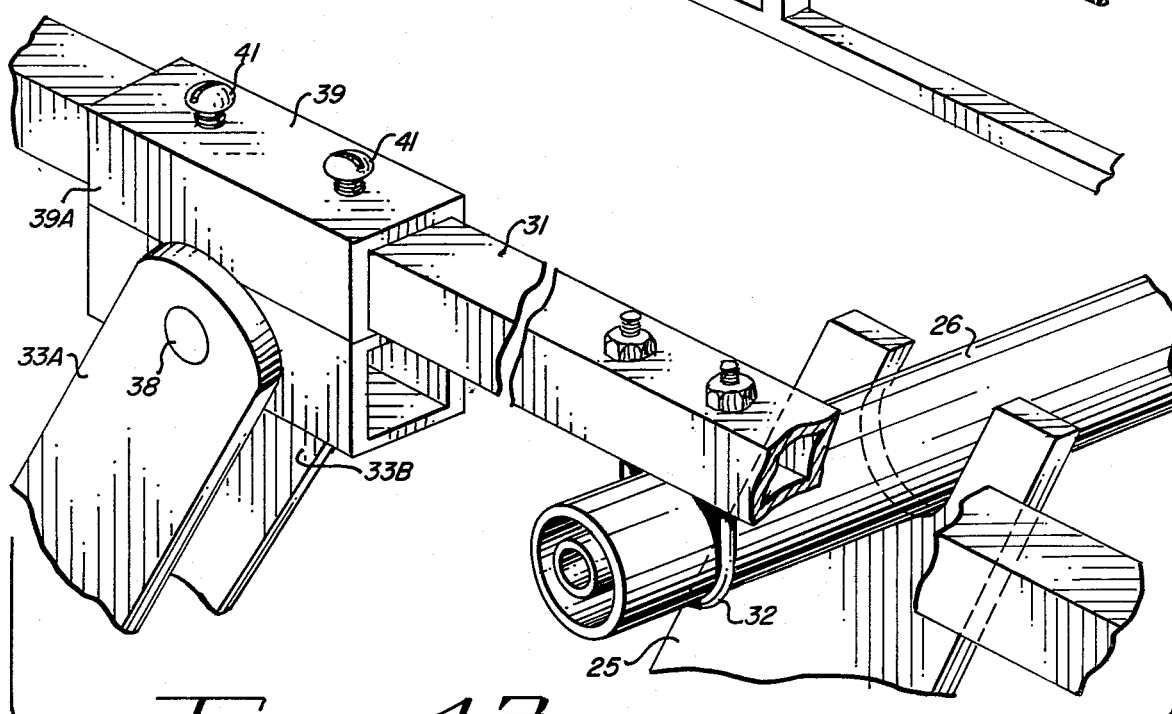
FIG. 13 is an enlargement of sector 13 of FIG. 12.

The pivotal mounting of reflectors 23 on the frame 24, as shown in FIGS. 2, 12 and 13, is accomplished by means of pivot pins 27 which pass through the top horizontal members 28 of the frame and through the ends of the reflector frames 29 at the base of the support arms 25 as shown. Parallel rows of reflectors 23 are coupled together by the parallel collector pipes 26 and by transverse coupler bars 31 which are placed at intervals along the lengths of the rows of reflectors. The coupler bars 31 are pivotally attached to each of the collector pipes 26 by means of U-shaped brackets 32 which surround pipes 26 and pass through holes in coupler bar 31. By virtue of the coupling thus afforded by pipes 26 and bars 31, reflectors 23 are caused to rotate in unison as the coupler bars 31 are moved horizontally.

The drive mechanism for the provision of such horizontal motion of the coupler bars includes a rocker arm 33 and a jackscrew 34 associated with each coupler bar 31, and a common tracking motor 35 and screw 36.

The rocker arm 33 comprises two identical arms, each fashioned from flat metal stock in the general shape of a boomerang. The two arms 33A and 33B are placed on opposite sides of the top frame member 28 of frame 24 and are pivotally attached thereto at their centers by means of a pivot pin 37. The upper ends of arms 33A and 33B are pivotally attached to bar 31 by means of a pivot pin 38 and a clamping fixture 39 as shown most clearly in FIGS. 12 and 13. The clamping fixture 39 has an upper portion 39A which slides over bar 31 and is clamped thereto by means of set screws 41. The lower portion 39B of fixture 39 carries a hole through which pivot pin 38 is passed as it picks up mating holes in the ends of arms 33A and 33B. The portions of arms 33A and 33B extending upward from the center pivot pin 37 are equal in length with arm 25 which carries the collector pipe 26 and the position of fixture 39 on the bar 31 is adjusted so that the upper portion of arm 33 is parallel with arm 25 so that arm 33 and reflectors 23 may pivot freely together about their respective pivot points. The lower portions of arms 33A and 33B have longitudinal slots 42 traversing most of their lengths.

Jackscrew 34 is aligned parallel with coupler bar 31 and it passes horizontally through free rotation bearings 43 installed in the centers of vertical support members 44 of frame 24, the upper ends of which are attached to the underside of member 28. Jackscrew 34 also passes between the lower slotted portions of arms 33A and 33B to which it is coupled by means of pins 45 which extend though slots 42 and are welded to a nut 46 which is positioned between the arms 33A and 33B and is threadedly engaged with jackscrew 34 so that as jackscrew 34 is rotated, nut 46 moves horizontally carrying with it the lower end of arm 33 by virtue of the engagement of slots 42 by pins 45. A pivoting motion of arm 33 is thus effected which in turn effects the pivotal motion of reflector 23 about its pivot pin 27.

Jackscrew 34 has at one end a wheel gear 47 which engages screw 36 in the manner of a worm gear so that the rotational drive of screw 36 by motor 35 produces a corresponding rotation of jackscrew 34. It will be noted that screw 36 lies perpendicular with jackscrew 34 and extends across the width of array 21 to be coupled to additional jackscrews 34' which pivotally drive additional banks of reflectors 23.

The boomerang configuration of arm 33 has utility in affording a slight tilt to the direction of the reflectors in the center of its pivotal range at which point a vertical orientation of the lower part of arm 33 is most desirable. The vertical orientation, of course, permits equal travel of jackscrew 34 in both directions, and the tilt of the upper arm corresponds to the average elevation of the sun.

The rotational tracking capability of system 20 is provided by mounting array 21 on a rotating platform 48 which rides on the concentric concrete rings 22, shown in FIGS. 3-6 and 9-11.

Figure 3:
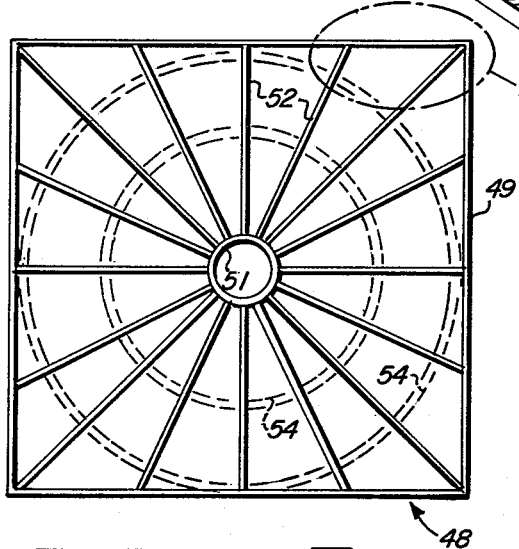
FIG. 3 is a top cross-sectional view of FIG. 1 taken along line 3—3.
Figure 6:
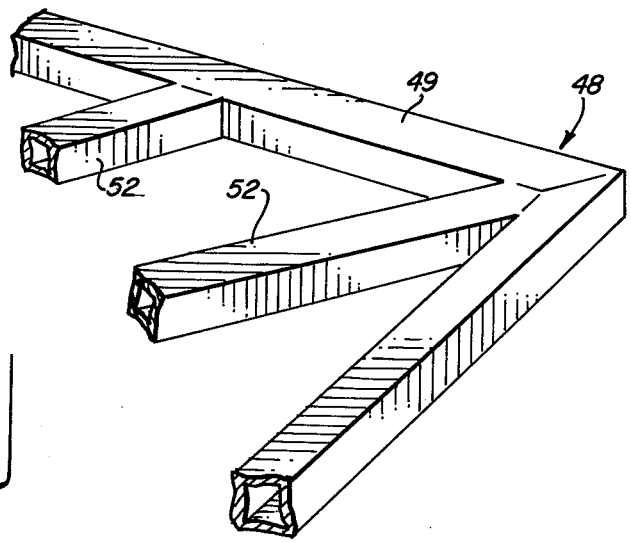
FIG. 6 is a close-up view of section 6 of FIG. 3.

Platform 48 as shown in FIGS. 3 and 6 comprises a square outer frame 49 and a center ring 51 joined by radial members 52 arranged like the spokes of a wheel between ring 51 and frame 49. The entire platform 48 is fabricated from lengths of tubular steel or aluminum welded together.

Figure 4:
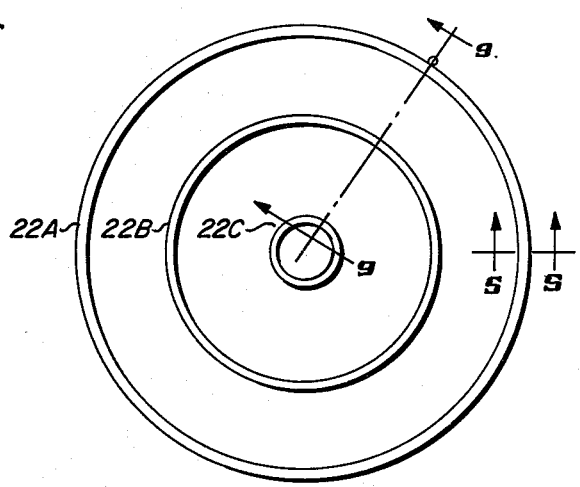
FIG. 4 is a top cross-sectional view of FIG. 1 taken along line 4—4.

A number of roller or wheel assemblies 53 are attached to the underside of platform 48 positioned for alignment with the three concentric concrete rings 22A-22C shown in FIG. 4. The broken line circles 54 of FIG. 3 indicate the positions of the two outer rings 22A and 22B relative to the platform 48. The intersections of the radial members 52 and the circles 54 define the positions of the wheel assemblies 53 which ride on the outer rings 22A and 22B. A lesser number of wheel assemblies 53 may be uniformly spaced about ring 51 to ride on center concrete ring 22C.

Figure 5:
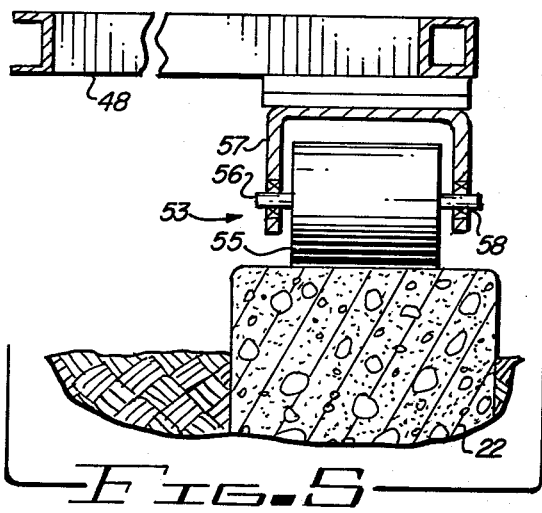
FIG. 5 is a cross-sectional view of FIG. 4 taken along line 5—5.

Each wheel assembly 53, as shown more clearly in FIG. 5, comprises, for example, a rubber tired roller 55 with an axle 56 supported by an inverted U-shaped bracket 57. The bracket 57 is welded or bolted to the underside of platform 48. Axle 56 is preferably carried by bearings 58 held by bracket 57. Each wheel assembly 53 is oriented such that its axle 56 is aligned with the adjacent radial member 52 of platform 48 so that as platform 48 is rotated about its center rollers 55 follow smoothly along the flat topped concrete rings 22A-22C.

The cross-sectional view of FIG. 9 shows three radially aligned rollers 55 riding atop three rings 22A, 22B and 22C, the vertical center line of platform 48 and of rings 22 being shown as line 59 at the left of FIG. 9. Also shown in FIG. 9 is a positioning wheel 61 which is mounted to frame 48 by means of an L-shaped bracket 62 to locate and position wheel 61 so that it rides against the inside vertical surface of inner ring 22C. Several such positioning wheels are located about the underside of ring 51 of platform 48 for the purpose of securing the centered position of platform 48 over rings 22A-22C as it rotates thereon.

The mechanical drive system for the rotation of platform 48 on rings 22, as shown in FIGS. 9-11, comprises a low-speed motor 63 with a drive sprocket 64 directly mounted to the motor shaft, a bracket 65 which carries two idler sprockets 66 and 67, a roller chain 68 and two heavy coil springs 69.

Chain 68, as shown in FIG. 11, is of the type commonly employed in chain-and-sprocket combinations, an example of which is the ordinary bicycle chain.

Bracket 65 has an L-shaped cross-section, the upper part being utilized to mount motor 63 to frame 48 and the perpendicular lower portion being utilized to mount the idler sprockets 66 and 67.

As shown in FIGS. 10 and 11, motor 63 is mounted with its shaft directed vertically downward so that the drive sprocket lies in a horizontal plane. Idler sprockets 66 and 67 have their axles secured vertically to the horizontal lower sections of bracket 65 and are positioned one on each side of the drive sprocket 64 coplanar therewith.

Chain 68 is coupled by means of the two springs 69 to outer ring 22, each end of the chain being attached to a first end of one of the springs 69, and the other end of each of the springs 69 being attached to a steel ring 71 which is anchored to the vertical outer surface of concrete ring 22A. When attached in this manner, chain 68 extends horizontally along approximately 240 degrees of the periphery of ring 22A. The vertical position of chain 68 which is just below the top surface of ring 22A, and in line with the sprockets 64, 66 and 67 is held at a number of points by means of steel U-shaped guides 72 which are secured to the surface of ring 22A.

In the complete assembly as shown in FIG. 10, chain 68 is engaged with the three sprockets 64, 66 and 67 passing from left to right behind idler sprocket 66, between idler sprocket 66 and drive sprocket 64, over the front of drive sprocket 64, between sprockets 64 and 67, and then behind sprocket 67. The tension of springs 69 maintains the engagement of chain 68 and sprockets 64, 66 and 67 so that as the low speed motor 63 is turned in one or the other directions, the drive sprocket 64 is caused to travel in a corresponding direction along the length of chain 68 carrying with it motor 63, bracket 65 and the attached edge of frame 48 so that frame 48 and array 21 which is mounted thereon are rotated in either direction as motor 63 is energized.

The nearly 240 degrees of rotation thus afforded is adequate to permit array 21 to track the daily path of the sun across the horizon from sunrise to sunset, and the simultaneous control of the elevation of the reflectors as described earlier in connection with the operation of the tracking motor 35 permits a complete and total tracking capability in accordance with a primary object of this invention.

Figure 7:
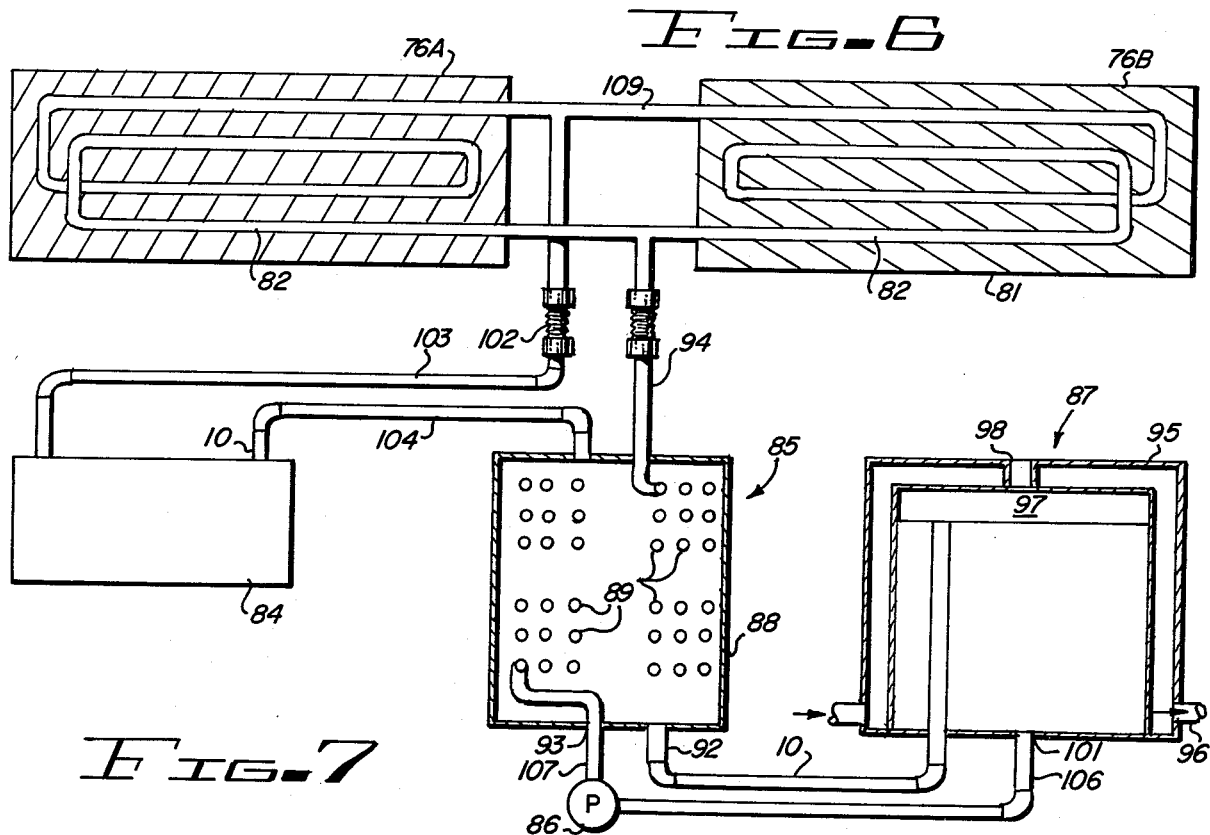
FIG. 7 is a diagrammatic representation of the plumbing and energy exchange system embodied in the invention.
Figure 8:
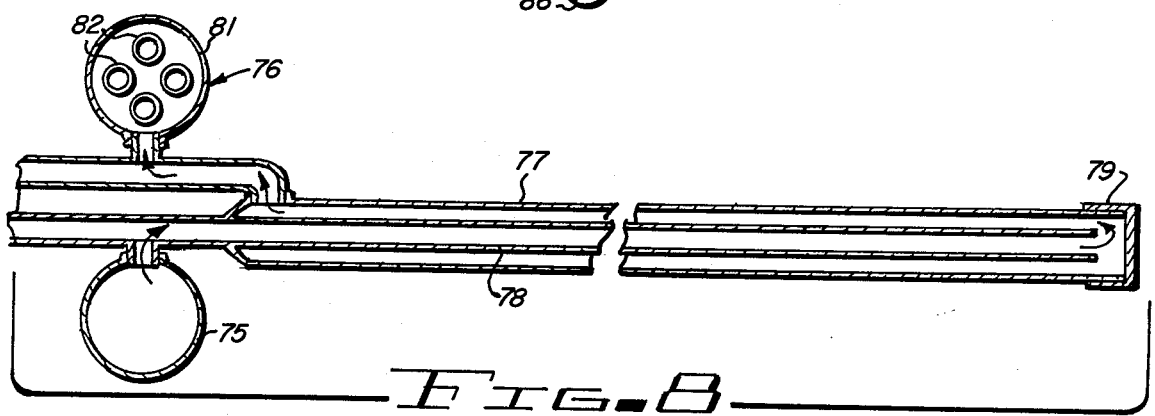
FIG. 8 is a cross-sectional view of a collector inlet and heat exchange pipes incorporated in the solar energy system of the invention.

In a typical embodiment of system 20, the energy collection means described is supplemented by energy transfer and conversion means as shown in FIGS. 7 and 8.

FIG. 8 shows in cross-section collector pipe 26 along with inlet manifold 75 and heat exchanger 76.

The collector pipe 26 may comprise a blackened copper outer tube 77 and a concentric inner tube 78. The outer tube 77 is closed by a cap 79 at its outer end and the open outer end of inner tube 78 terminates just short of the end of outer tube 77.

The inlet manifold 75 is a relatively large pipe running perpendicular with collector pipes 26 across the center of array 22 communicating with the inner tubes of all of the collector pipes 26 of the array.

The heat exchanger 76 which lies parallel with the inlet manifold 75 comprises a large insulated outer pipe 81 and an array of, for example, four connected copper tubes 82 contained within the outer pipe 81. The inner tubes 82 are not in communication with the fluid surrounding them within outer pipe 81 or with the fluid flowing through manifold 75 and the collector pipes 26 but the space outside the tubes 82 does open directly into the inner end of outer tube 77 of collector pipe 26.

The fluid flow path for collector pipe 26 begins at the inlet manifold 75 flowing outward through inner tube 78, emptying into the outer end of outer tube 77, then flowing back toward the center through the space between the inner tube 78 and the outer tube 77, through a connecting tube 83 into heat exchanger 76 through the space inside pipe 81 and surrounding tubes 82. The relatively cool or low energy fluid emptying from the outer end of tube 78 gains thermal energy from outside tube 77 as it returns toward heat exchanger 76, then gives it up again by transferring heat to the inner tubes 82 of exchanger 76. The fluid circulating in this path should have a high boiling point relative to that of water. Mineral oil or an appropriate synthetic material may be employed.

The energy conversion system 80 as shown in FIG. 7 comprises a steam engine 84, a pre-heater 85, a pump 86 and a condenser 87.

The representations of the heat exchangers 76A and 76B in FIG. 7 show the path of inner tube 82 as it makes two round trips from one end of pipe 81 to the other and back again.

The pre-heater 85 comprises an outer tank 88 and a coiled inner tube 89 comprising, for example, 300 feet of one-half inch soft copper tubing. Inlet and outlet ports 91 and 92, respectively, are provided for outer tank 88 and inlet and outlet ports 93 and 94, respectively, are provided for tube 89.

Condenser 87 has a hollow outer shell 95 through which cooling water 96 is circulated. Its inner chamber 97 is vented to atmospheric pressure by an opening 98 in its top surface. Inlet and outlet ports 99 and 101, respectively, are provided in shell 95.

Plumbing of system 80 includes the following: A flexible hose 102 connects the outlet of exchanger 76A to an inlet pipe 103 of engine 84. The exhaust of engine 84 is connected by a pipe line 104 to inlet port 91 of pre-heater 85. Outlet port 92 of pre-heater 85 is connected by a pipe line 105 to inlet port 99 of condenser 87. Outlet port 101 of condenser 87 is connected by a pipe line 106 to the intake of pump 86. The outlet of pump 86 is connected by a pipe line 107 to inlet port 93 of pre-heater 85. Outlet port 94 of pre-heater 85 is connected by a flexible hose 108 to the inlet port of exchanger 76B and the outlet port of exchanger 76B is connected by a pipe line 109 to the inlet port of exchanger 76A.

In the operation of system 80, steam at approximately 400° F. and 250 psi (pounds per square inch) leaves exchanger 76A through hose 102 and enters engine 84 through line 103. Engine 84 converts thermal energy released by the steam into mechanical energy as the steam expands and cools and the depleted steam is exhausted at approximately 280° F. and 10 psi through line 104 into port 91 of pre-heater 85. Inside pre-heater 85, the depleted steam passes through and around the coiled copper tube 89 and exits through port 92 and pipe line 105, then enters condenser 95 through inlet port 99. In condenser 95, the steam is converted to water which is withdrawn by pump 86 through port 101 and pipe line 106 into pump 86, discharging through pipe line 106 into pump 86, discharging through pipe line 107 into port 93 of pre-heater 85. In pre-heater 85, the water passes through coiled tube 89 which is in intimate contact with the depleted steam and an energy transfer takes place in which the energy of the steam is further depleted by pre-heating the water passing upward through tube 89.

A dual advantage is gained in that the cooling of the steam aids the condensation process of condenser 95 and the pre-heating of the water salvages thermal energy for improved overall efficiency. The pre-heated water then leaves pre-heater 85 through port 94 and passes through flexible hose 108 into exchanger 76B. As the water passes through tube 82 of exchanger 76B it picks up thermal energy from this heat converter, is partially converted to steam, then passes through line 109 into exchanger 76A where it absorbs additional thermal energy which completes its conversion to the high temperature, high pressure steam which exhausts through hose 102 and pipe line 103 into engine 84.

The flexible hoses 102 and 108 connecting the exchangers 76A and 76B to the balance of the system 80 permit the exchangers 76A and 76B to be mounted on the moving platform 48 while the engine 84, the pre-heater 85, the pump 86 and the condenser 87 are mounted on a fixed foundation. It will be appreciated that platform 48 does not make a complete revolution. After tracking the path of the sun during the day, its rotation is reversed to return platform 48 to the starting point for the following day.

The steam cycle just described will be recognized as conventional. The only difference between system 80 and a conventional steam power plant is that operating temperatures and pressures must be held at levels which are compatible with the other elements of system 20 including the collector pipes 26, exchangers 76 and flexible hoses 102 and 108.

With the exception of the control circuits which control the tracking motor 35 and the low speed motor 63 which rotates platform 48, a complete and effective solar energy system has been described in accordance with the stated objects of the invention.

Although but a single embodiment of the invention has been illustrated and described, it will be apparent to those skilled in the art that various changes and modifications may be made therein without departing from the spirit of the invention or from the scope of the appended claims.

What is claimed is:

1. An improved heat exchange means comprising:
   a frame,
   said frame being rotatably mounted on a support for movement through an arcuate path,
   at least a pair of juxtapositioned reflectors,
   each of said reflectors comprises a trough having a reflecting surface having a parabolic configuration,
   means for pivotally mounting each of said reflectors in a parallel arrangement on said frame,
   a fluid bearing tube extending longitudinally of each of said reflectors on said frame and approximately disposed with the axis of a portion of said tube in the focal zone of an associated reflector outside of the periphery of its parabolic configuration,
   electric means for moving said reflectors independently of said frame in unison through a similar arc partially around the portion of the tube associated with each of the reflectors for maintaining said reflectors with the axis of their curvature approximately in a plane containing the sun's center, and
   means for sensing the position of the sun for energizing said electric means for moving said frame and said reflectors independently of each other to orient and maintain said frame and reflectors with their axes of curvature of their reflective surfaces approximately in a plane containing the sun's center,
   said means for sensing the position of the sun comprising an electric motor mounted on said frame for driving said frame sequentially back and forth around at least a portion of said support,
   whereby the reflection of the sun's rays are concentrated by said reflectors in a line image along said portions of said tubes.

2. The improved heat exchange means set forth in claim 1 wherein:
   the support on which said frame is mounted comprises an arcuate configuration.

3. The improved heat exchange means set forth in claim 1 wherein:
   the support on which said frame is mounted comprises a pair of concentric closed circular supporting walls.

* * * * *